Jan. 15, 1957   J. P. FOSNESS ET AL   2,777,650
AIRCRAFT CATAPULT AND LANDING BARRIER ARRANGEMENT
Filed Jan. 19, 1954   4 Sheets-Sheet 1

John P. Fosness &
James E. Harrison
   INVENTORS.

BY *[signature]*

ATTORNEY.

Jan. 15, 1957   J. P. FOSNESS ET AL   2,777,650
AIRCRAFT CATAPULT AND LANDING BARRIER ARRANGEMENT
Filed Jan. 19, 1954   4 Sheets-Sheet 2

John P. Fosness &
James E. Harrison
INVENTORS.

BY *James M. Clark*

ATTORNEY.

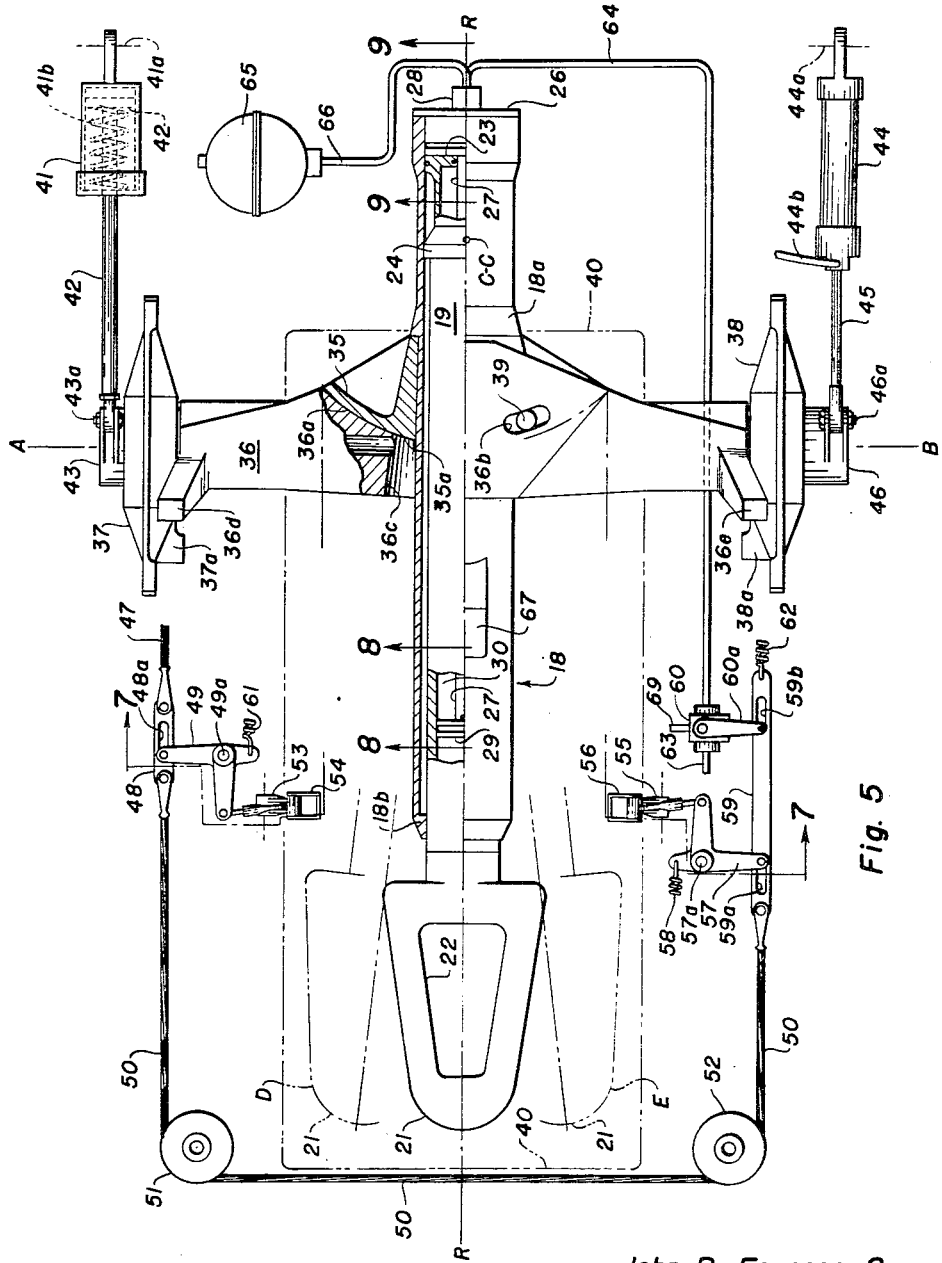

Jan. 15, 1957  J. P. FOSNESS ET AL  2,777,650
AIRCRAFT CATAPULT AND LANDING BARRIER ARRANGEMENT
Filed Jan. 19, 1954  4 Sheets-Sheet 4
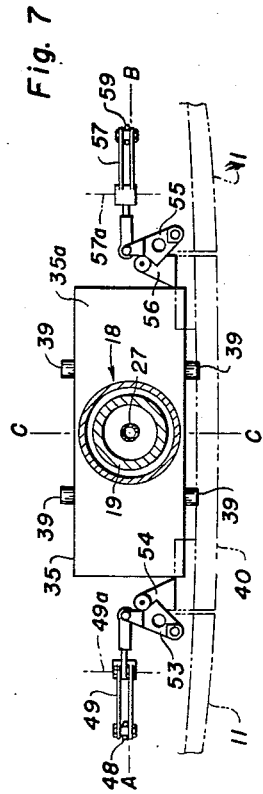
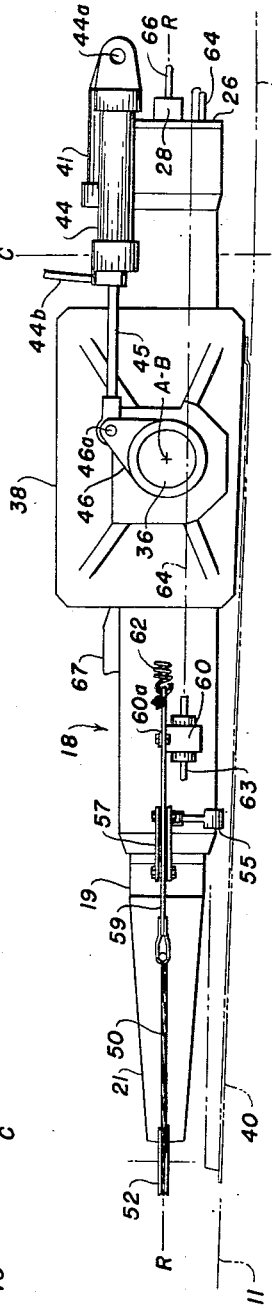
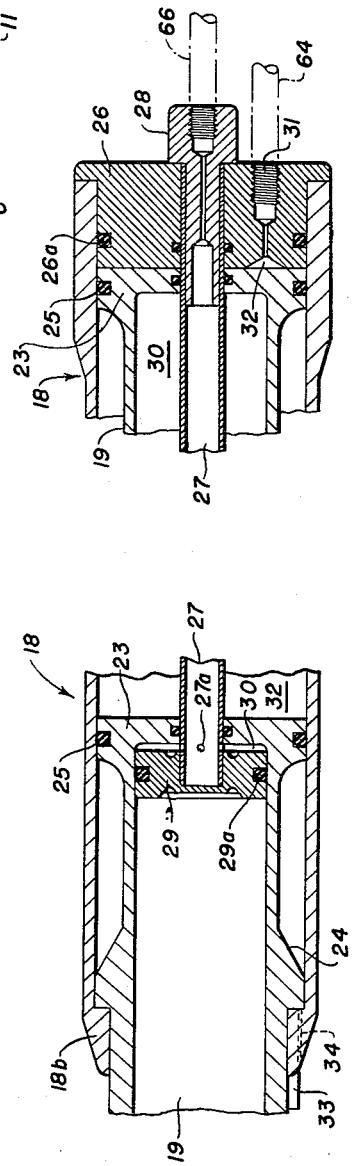
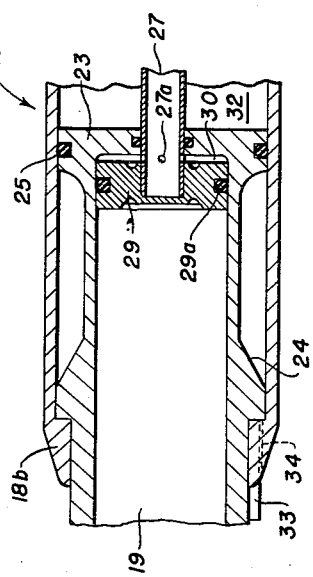
John P. Fosness &
James E. Harrison
INVENTORS.
BY *James M. Clark*
ATTORNEY.

United States Patent Office 2,777,650
Patented Jan. 15, 1957

2,777,650

AIRCRAFT CATAPULT AND LANDING BARRIER ARRANGEMENT

John P. Fosness, Pacific Palisades, and James E. Harrison, Redondo Beach, Calif., assignors to North American Aviation, Inc.

Application January 19, 1954, Serial No. 404,838

7 Claims. (Cl. 244—63)

The present invention relates to aircraft and more particularly to improved components for catapult type take-offs and barrier type landing arrangements.

This invention is directed to an improved combined bridle assembly of a retractable and extensible type which is pivotally supported upon the aircraft in an improved mounting which also permits the catapult bridle to be adapted for alternate or emergency use as a barrier crash fitting. In a preferred form of the present invention, the bridle assembly is comprised of piston and cylinder components including a pair of opposed telescoping pistons arranged for extension and retraction by hydraulic fluid actuation. The cylinder component is preferably mounted for lateral rocking movement by engagement with a transverse trunnion assembly with which it is engaged by a cylindrical bearing surface providing relatively large contact area. The trunnion member is mounted for rocking movements in a fore and aft plane about its transverse axis and is arranged to resiliently assume a static position from which the bridle component can be extended into operative position for a catapult take-off or from which, in the compacted position of the bridle component, the assembly is adapted for crash landing barrier conditions. The improved take-off and landing component is additionally provided with a fairing door which is extended and retracted with the bridle assembly and includes a hydraulic actuating system controllable by the pilot for extension and retraction of the assembly to the several operating positions as well as the compacting of the bridle element.

The present invention accordingly comprises a combined automatic catapult bridle and barrier crash fitting installation consisting of an outer cylinder journalled to the aircraft structure for limited lateral movement and for rotation about a transverse axis to an operative position, and an inner telescoping cylinder which terminates in an eye fitting for engagement with a shuttle member of the deck catapult. The installation is provided with a fairing door or closure suitably locked to the aircraft structure and the assembly is arranged such that when the associated door "up" locks are released, the entire assembly is rotated about its transverse axis to an operative position by a snubber unit and the bridle eye piston member is extended by fluid pressure, which displaces fluid from the other side of the piston to an air-oil reservoir where it is stored under pressure and serves to automatically retract the piston member when the bridle fitting disengages from the catapult shuttle member. The improved installation also includes a hydraulic retracting motor which rotates the unit to its inoperative stowed position in which the "up" locks on the door are automatically re-engaged. The combined catapult bridle and barrier crash fitting arrangement also comprises the inclusion of a lug or hook portion carried upon the top of the bridle cylinder such that in the event of a barrier crash the deck cable will be contacted by the extended bridle and deflected upwardly into engagement with the lug for the safe deceleration of the aircraft.

It is, accordingly, a primary objective of the present invention to provide an improved combined landing and take-off assembly for aircraft which is capable of being remotely controlled by the pilot or other operator for power operated extension and retraction with respect to the body of the aircraft. A further object resides in the provision of an improved catapult bridle assembly comprising piston and cylinder components and a novel double telescoping piston arrangement whereby the bridle eye may be extended to its operative position or compacted either for its crash barrier position, or for retraction within the aircraft. A further object resides in providing an improved mounting of the bridle assembly within a trunnion fitting by means of a cylindrical bearing surface permitting limited lateral movement of the bridle assembly. A further object resides in an improved fairing door arrangement for the combined bridle and crash barrier components which is simultaneously extended with the components and serves to fair the assembly in its retracted position. A still further object resides in providing improved actuating mechanisms for the sequential unlocking of the fairing door, the rocking of the bridle assembly to a static operative position and the hydraulic extension of the bridle eye portion for engagement with the catapult. Still further objects of the present invention include the provision of means whereby the bridle assembly in a compacted position of the bridle eye component is adapted for engagement by the deck cable in a crash barrier landing and the rocking of the assembly is adapted to resiliently oppose the shock of such a landing. Further objects and advantages of the present invention reside in the several improved components of the disclosed arrangement and in the novel cooperation and inter-relationship of these components with each other.

Other objects and advantages of the present invention will become apparent to those skilled in the art after reading the following description, taken in conjunction with the accompanying drawings forming a part hereof, in which:

Fig. 5 is an enlarged plan view, partially cross-sectioned, of the complete installation showing the telescoping bridle components and their mounting in the trunnion member;

Fig. 6 is a side elevational view of the same;

Fig. 7 is a transverse sectional view taken along the lines 7—7 of Fig. 5 looking aft;

Fig. 8 is an enlarged fragmentary cross-sectional view of the bridle components in the extended condition as taken along the lines 8—8 of Fig. 5; and Fig. 9 is a similar cross-sectional view of the bridle components in their telescoped or compacted condition as taken along the lines 9—9 of Fig. 5.

Figure 1:
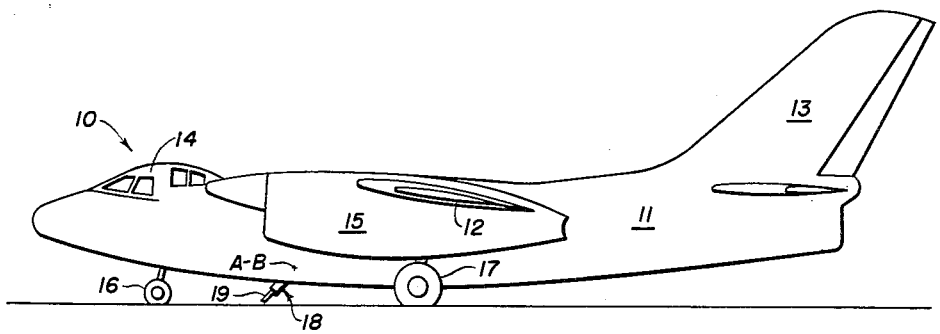
Fig. 1 is a general arrangement view in side elevation of an airplane to which a form of the present invention has been applied.
Figure 2:
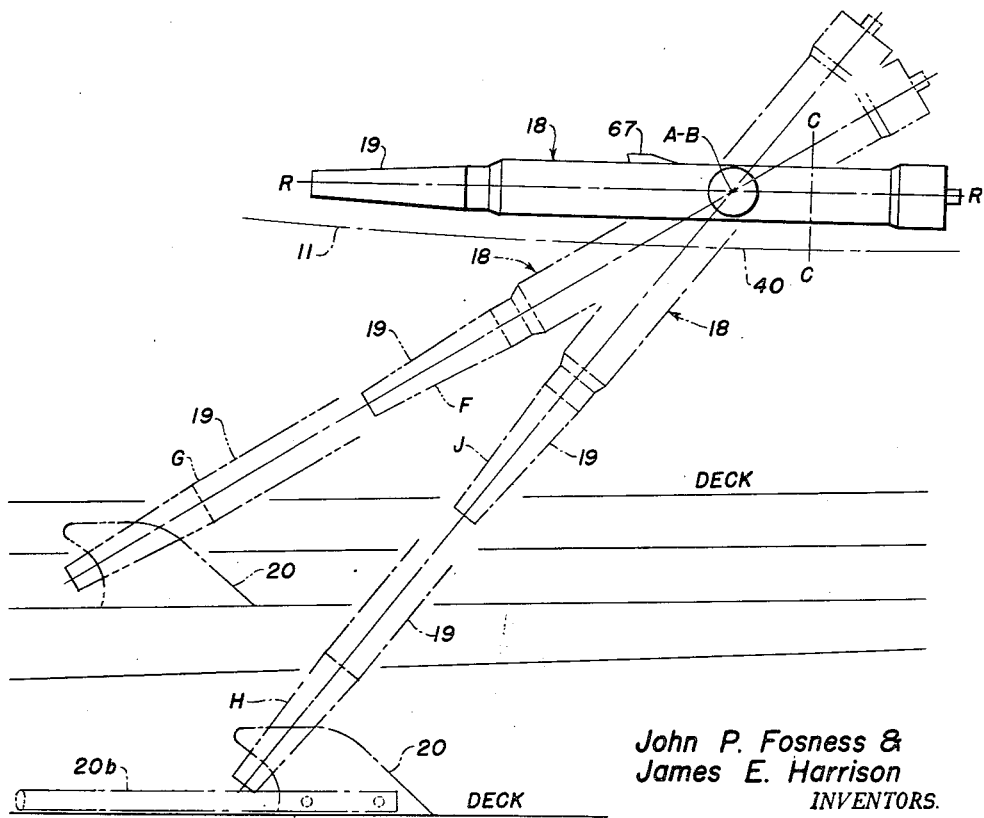
Fig. 2 shows a similar but enlarged view of the improved bridle assembly indicating its relative operative and retracted positions in respect to a catapult shuttle.

Fig. 1 shows an airplane 10 having a fuselage 11, laterally extending wings 12, a tail assembly 13, a control cockpit 14 and suitable power plants 15 all of which may be more or less of a conventional nature. Upon the forward portion of the fuselage 11 there is mounted a nose wheel 16 and beneath the wings 12, or the power plants 15, there is preferably mounted a pair of landing gear components 17. Intermediate the main and nose landing gear units, there is mounted within the fuselage upon the transverse axis A—B an improved form of the present catapult and crash barrier engaging bridle components comprising the cylinder member 18 and the telescoping or slidably reciprocable piston member 19. As more particularly shown diagrammatically in Fig. 2, the bridle components 18 and 19 are housed within the fuselage 11 in their compacted and retracted condition along the substantially horizontal and longitudinal axis R—R. From this retracted position, the components 18 and 19 may be rocked about the transverse axis A—B to an operative position "F" for a barrier landing, as well as to the extended positions G and H for catapult take-offs in which the eye or opening in the point of the bridle member 19 engages the catapult shuttle 20, into which it is suitably and automatically guided in the lateral sense by the curved centering members 20a and 20b. Fig. 2 also indicates various deck line relationships to the aircraft.

As indicated above, and as more particularly shown in Figs. 5, 8 and 9, the bridle assembly comprises the inner and the outer telescoping members 19 and 18, respectively, which are suitably keyed together as by the key 33 on the outside of the piston 19 and the keyway 34 formed in the end shoulder 18b of the cylinder 18, as shown in Fig. 8, in order to prevent relative rotation of the inner piston member 19 with respect to the outer cylinder member 18. The extensible or piston member 19 terminates at its outer end in a fitting 21 having a central eye or opening 22 for engagement with the shuttle member 20 of the deck catapult, or for engagement with another ground-engaging member. The opposite end of the piston member 19 forms an orificed piston head 23 with a spaced shouldered portion 24, both being of the same enlarged diameter for engagement with the bore of the cylinder member 18. The corresponding end of the member 18 is provided with a cylinder head element 26 which is provided with a fluid-tight static O-ring seal 26a against the bore of the cylinder 18, there being a similar but movable fluid-tight seal 25 in the head 23 of the piston member 19. Both the piston and cylinder heads 23 and 26, respectively, are axially bored to receive the central tubular element 27 which is fixedly mounted within the cylinder head 26, within which as well as within the piston head 23, suitable fluid O-ring seals are also provided. The adjacent end of the tube 27 is provided with a bored and threaded port fitting 28 and the opposite end of the tube 27 is provided with an inner piston head 29 arranged to reciprocate within the bore of the tubular piston member 19 against which it is sealed by the O-ring seal 29a. A fluid chamber 30 is accordingly formed between the piston head 23 and the inner piston head 29, being placed in communication with the interior of the tube 27 by the series of apertures or orifices 27a through the wall thereof. A further and larger diameter chamber 32 is formed between the piston head 23 and the cylinder head 26 and access to this chamber 32 is provided through the cylinder head 26 by the port 31. Hydraulic fluid is admitted into the chamber 32 through the fluid line 64 and the port 31 within the cylinder member 18 for the purpose of extending the piston member 19. The fixed central tube 27 connects with the air-oil reservoir 65 through the conduit 66 and the port fitting 28 and upon release of the extending pressure within the chamber 32, pressure is applied through the tube 27 and the orifices 27a to the chamber 30 to effect the retraction of the piston member 19. The pressure from the air-oil reservoir 65 entering the port 28 from the line 66 keeps the bridle point in retracted position unless extended by hydraulic pressure entering port 31 or if the shuttle 20 is engaged.

The entire bridle assembly comprising the piston member 19 and the cylinder member 18 is mounted to pivot about the axis C—C by virtue of the cylindrical sector 35 having its central axis disposed at C—C and having its part-cylindrical bearing face 35a in sliding contact with the corresponding cylindrical bearing face 36a of the housing or trunnion fitting 36. This pivotation about the axis C—C, which is disposed normal to the axis R—R passing longitudinally through the bridle assembly 18—19, permits lateral movement of the bridle fitting 21 from its central full line position shown in Fig. 5 to the laterally disposed construction line positions indicated at "D" and "E," to permit self-aligning engagement with the deck shuttle 20. The sector fitting 35 is fixed to the outer wall of the cylinder member 18 and is prevented from relative axial movement with respect thereto by the external boss or shoulder 18a formed on the cylinder member 18. The trunnion fitting 36 in addition to its cylindrical bearing surface 36a, having its center disposed at the axis C—C, is provided with arcuate slots 36b for limiting the lateral angular displacement of the pins 39 fixed to the sector fitting 35 and to the bridle assembly 18—19. The trunnion fitting 36 is further provided with a tapering opening 36c within its central portion to permit of this lateral movement of the bridle assembly 18—19. End support bearing fittings 37 and 38 are fixedly mounted upon the fuselage structure and form the pivotal bearings for the ends of the trunnion fitting 36 such that it may rock within limits defined by the stops 37a and 38a carried by the bearing fittings 37 and 38 and engageable by the integral projections 36d and 36e formed upon the trunnion fitting 36 to limit the rocking about the transverse axis A—B. The substantially rectangular fairing door 40 is fixedly supported from the transverse trunnion fitting 36 to rock therewith about the transverse axis A—B when the bridle assembly is extended. This fairing door 40 is preferably curved in the lateral direction to conform to the external streamline shape of the fuselage bottom, and it may of course also be curved in the longitudinal direction in order to completely fair the opening within which the bridle component are stowed.

A snubbing cylinder 41 containing a compression spring 41b is pivotally mounted upon the fuselage structure upon the axis 41a and contains a reciprocably mounted piston element 42. The forward terminal of the latter is pivotally connected to the arm 43 by the pivot bolt 43a, the arm 43 being fixedly attached to the end of the trunnion member 36. The purpose of the snubbing unit 41 is to position the bridle assembly in an operative extended attitude as indicated at F in Fig. 2 when the fairing door locks are released by the pilot. The unit 41 is in effect an intermediate stop link, holding the bridle mechanism in the static position F until the barrier crash cable 68 is picked up; the piston 42 then is extended by the load against the spring until the trunnion member 36 hits the stops 37a and 38a. At the opposite end of the trunnion member 36, there is disposed a fluid retracting motor 44 comprising a cylinder or body which is pivotally mounted upon the aircraft structure at 44a and which receives its actuating fluid through the flexible conduit 44b. The fluid motor 44 is normally spring loaded to its extended position and is retracted or compacted by hydraulic pressure from the line 44b. The piston 45 of the fluid motor is pivotally connected at its outer end to the arm 46 by the pivot bolt 46a. The arm 46 is fixedly attached to the end of the trunnion member 36 such that as hydraulic fluid under pressure enters the cylinder 44 through the conduit 44b the piston is drawn toward the pivotal mounting 44a and the bridle assembly is rotated in the clockwise direction as viewed in Fig. 2 from either the position F, or after the compaction of the assembly, from the position G or H to the retracted position along the axis R—R.

The mechanism for the release of the bridle assembly together with the fairing door 40, and the subsequent extension of the bridle carrying piston member 19, includes the actuating cable 47 which extends to the pilot compartment and tensioning or pull of which initiates the release operation. The cable 47 is pivotally connected to the slotted link 48 containing the elongated slot 48a which is engaged by one of the arms of the bellcrank member 49 pivotally mounted upon the fuselage structure at 49a. A further arm of the bellcrank member 49 is pivotally connected to the door latch engaging mechanism 53 for engagement with the roller fitting 54 rotatably mounted upon the door 40. The remaining arm of the bellcrank 49 is tensioned by the spring 61, connected to the fuselage structure, which spring resiliently maintains the door latch mechanism in its engaged or locked position. The opposite end of the slotted link 48 is connected to the cable 50 which extends around the sheaves 51 and 52, pivotally mounted upon the fuselage structure, and terminates in an end of the elongated link 59 provided with the slots 59a and 59b adjacent its opposite terminals. The first of these slots 59a is engaged by an arm of the bellcrank 57, pivotally mounted upon the fuselage at 57a, and having an opposite arm tensioned by the spring 58 connected to the fuselage structure. The remaining arm of the bellcrank member 57 is pivotally connected to the latch mechanism 55 which engages the roller fitting 56 carried by the door 40 at its laterally disposed edge opposite the first said roller fitting 54. The slot 59b at the opposite end of the link 59 is engaged by the actuating arm 60a of the fluid valve 60 and the adjacent end of the link 59 is resiliently connected to the adjacent fuselage structure by the tensioning spring 62. The two-way valve 60 is connected through the conduit 63 with a suitable source of hydraulic fluid under pressure, through the connection 69 with a return line and an outlet of the valve is connected by the flexible conduit 64 with the above-mentioned port 31 providing communication with the end chamber 32 within the piston-cylinder bridle assembly 18—19. The two-way valve 60 in its normal position as shown in Fig. 5, corresponding to the retracted position of the mechanism, closes off the supply line 63 and provides communication between lines 64 and 69.

It will, accordingly, be noted that in preparation for a catapult take-off, the pilot initially taxis the airplane into position so that the bridle is slightly forward of the shuttle at which point the airplane holdback means is engaged. He may then release the bridle assembly 18—19 which, together with the fairing door 40, is retained in the "up" position by means of the cable-operated up-locks 53 and 55 which engage the opposite edges of the fairing door 40. Pull upon the pilot's spring-loaded control handle and the cable 47, as viewed in Fig. 5 initially causes clockwise rotation of the bellcrank 49 about its pivot 49a as viewed in Fig. 5, and through the cable 50, similar clockwise rotation of the bellcrank lever 57 about its pivot 57a, thereby simultaneously releasing both of the door latch mechanisms 53 and 55, and lowering the bridle assembly. The second slot 59a in the link 59 serves as a lost-motion or sequence mechanism to delay the operation of the valve 60 until the bridle assembly 18—19 and its fairing door has been released and is deflected downwardly and lowered into the rotated position F as shown in Fig. 2 by the action of the snubbing cylinder 41.

Accordingly, after the assembly has been rotated into the position F of Fig. 2 the end of the link 59a engages the arm 60a of the valve 60 which, in rotating in the clockwise direction, as viewed in Fig. 5, closes off the return line 69 and permits fluid under pressure from the pressure line 63 to pass through the flexible conduit 64 and the port 31 to the chamber 32 where it acts against the piston head end 23 to force the piston member 19 outwardly of the cylinder 18 to its fully extended and lowered position G as shown in Fig. 2. In this position G, the shuttle 20 of the catapult is tensioned and moved forwardly within its slot 20c to automatically engage the eye 22 of the bridle in a self-aligning arrangement. Alternatively, the bridle assembly may also be rocked in the generally vertical plane about the transverse axis A—B as well as laterally about the axis C—C by the shuttle guides 20a and 20b for positioning and engagement with the shuttle 20. In the event the shuttle 20 is disposed somewhat farther below the fuselage as the airplane takes off, the assembly may be rotated in the counterclockwise direction about the axis A—B as far as position H as shown in Fig. 2 where it may be conveniently disengaged from the shuttle as the aircraft flies off. Once the shuttle 20 is engaged with the eye 22 of the bridle the cable 47 may be released, and under the influence of the springs 58, 61 and 62, the up-lock hooks 53 and 55 are released and conditioned, and the two-way valve 60 is returned to the normal position. As the shuttle 20 is power-actuated and moved forward or to the left in Fig. 2, thereby catapulting the aircraft, the tension forces developed within the piston 19 are transmitted directly to the cylinder 18 by the shouldered portions 18b and 24; and from the cylinder member 18 they are transmitted to the trunnion 36 and the fuselage structure by contacting engagement of the trunnion 36 at its cylindrical bearing face 36a with the corresponding surface 35a of the sector fitting 35 against which the shouldered portion of the shoulder 18a of the cylinder 18 bears.

After the airplane has been catapulted, the bridle assembly is disengaged from the shuttle 20 and the extended portion 19 of the bridle is immediately and automatically returned to the compacted position shown at F by the pressure introduced into the chamber 30 through the tube 27 and the orifices 27a by the fluid flowing from the air-oil reservoir 65 into the flexible cable 66 and the port fitting 28. This is permitted by the prior return of the valve 60 to the normal position in which it opens the line 64 from the space 32 to the return line 69. After the piston 19 has been telescoped into the cylinder 18 to assume the position F of Fig. 2, suitable control valve means is opened to permit fluid under pressure to pass through the flexible conduit 44b into the retracting cylinder 44 for withdrawing the piston 45 such that the trunnion assembly 36 is rotated in the clockwise direction to retract the entire bridle assembly, together with its fairing door 40, into the "up" position at which the fairing door is automatically latched by the mechanisms 53 and 55 engaging the roller fittings 54 and 56, respectively, and into which latched position it is maintained by the tension springs 61, 62 and 58. The point of the bridle and the forward edge of the fairing door in its position F will clear the arresting gear cable and in the fully compressed condition of the landing gear struts and with the tires flat will also provide several inches clearance above the deck, as per Fig. 2.

Figure 4:
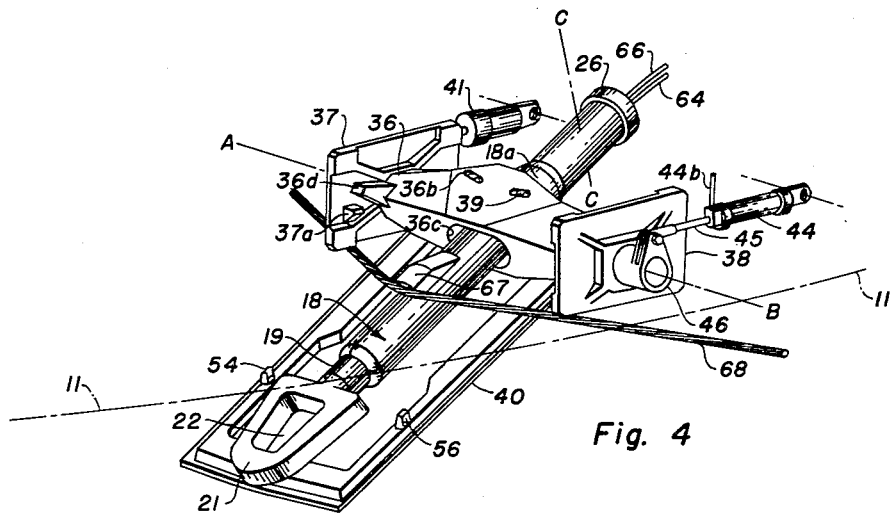
Fig. 4 is a similar perspective view showing the assembly in an extended operative position, but with the bridle component in a compacted position, arranged for engagement with a deck cable.
Figure 3:
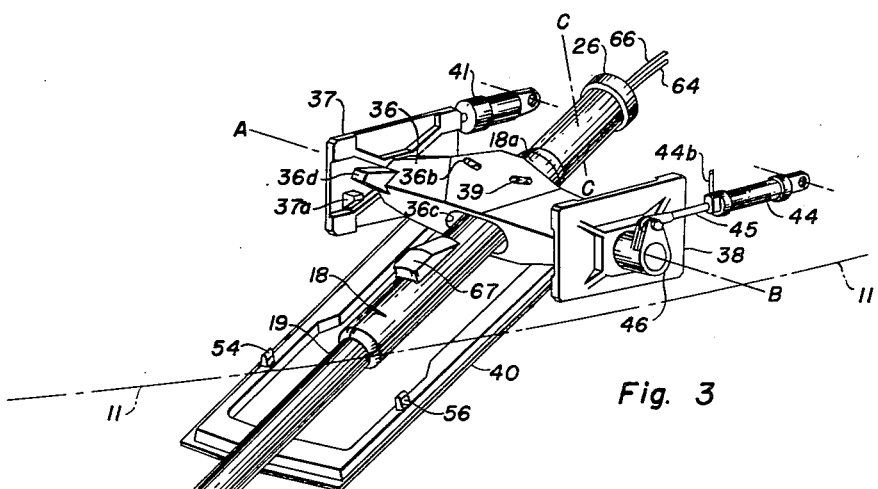
Fig. 3 is a perspective view of the arrangement showing the assembly in an extended operative position and the bridle component extended for engagement with a catapult shuttle.

As indicated above, the catapult bridle assembly 18—19 also serves in an alternate capacity for barrier crash landings. Upon coming in for an arrested landing, the pilot releases the bridle assembly from the retracted or "up" position together with the lowering of his arresting gear by pulling upon the cable 47, thereby unlatching the doors and permitting the assembly to assume the position indicated at F in Fig. 2. The cable 47 however is pulled only to an intermediate position at which it does not engage the handle of the two-way hydraulic valve 60 and accordingly the bridle assembly is rotated to the position indicated at "F" but the piston member 19 remains in its compacted position telescoped within the cylinder member 18 and the point is not extended. As previously described, the bridle assembly is resiliently maintained in the extended but compacted position F under the influence of the snubber cylinder 41. A heavy lug 67 integrally formed upon the upper surface of the cylinder member 18 adjacent the supporting housing or the trunnion fitting 36. In the event of a barrier crash, the deck cable 68, as shown in Fig. 4, will be contacted by the extended bridle and deflected upwardly into engagement with the hook or lug 67. The snubber cylinder 41 containing the heavy coil spring 41b will compress under this load to permit the bridle assembly to deflect to the position indicated at J shown in Fig. 2 at which point the lugs 37a and 38a are engaged by the projections 36d and 36e carried by the trunnion fitting 36. At this position J, and under typical barrier crash conditions the point of the bridle will also clear the deck line by a few inches. The catapult bridle support structure is capable of absorbing the high loads encountered in such a landing and is well adapted to serve this dual purpose. After completing the landing, and with the deck cable disengaged, the bridle assembly is preferably simultaneously retracted with the arresting gear.

Other forms and modifications of the present invention, both with respect to its general arrangement and the details of its respective parts, which will become apparent to those skilled in the art after reading the foregoing description, are intended to come within the scope and spirit of the present invention, as more particularly set forth in the appended claims.

We claim:

1. In an aircraft, a fuselage having an opening therein, a support member pivotally mounted within said fuselage, a cylinder member pivotally mounted upon said support member, a piston member telescopically mounted within said cylinder member, closure means operatively connected to said supporting member for closing and fairing said fuselage opening, control means for rotating said supporting member into an operative position, fluid means for extending and compacting said piston member with respect to said cylinder member, retracting means arranged for rotating said supporting member into a stowed position of said piston and cylinder members within said fuselage wherein said closure means closes said fuselage opening, and means carried by said cylinder member for engagement with a deck cable to facilitate landing of the aircraft.

2. In a catapult-engaging bridle assembly, a cylinder member having an internal bore and a cylinder head fixed to an end of said cylinder member, a piston member having a head portion telescopically engaging the bore of said cylinder member, the said piston member having an internal bore, an inner piston member fixedly supported from the cylinder head of said cylinder member and telescopically engaging the bore of said piston member, means for admitting fluid under pressure between the cylinder head of said cylinder member and the head portion of said piston member for extension of said bridle assembly, and means for admitting fluid under pressure between said inner piston and the head portion of said piston member for retraction of said piston member within said cylinder member.

3. A catapult-engaging bridle assembly comprising a support member pivotally mounted upon adjacent structure, a cylinder member having an internal bore and a cylinder head fixed to an end of said cylinder member, a piston member having an enlarged head portion telescopically engaging the bore of said cylinder member, the said piston member having an internal bore, means including a key and keyway for preventing relative rotation between said cylinder member and said piston member, an inner piston member fixedly supported from the cylinder head of said cylinder member and telescopically engaging the bore of said piston member, means for admitting fluid under pressure between the cylinder head of said cylinder member and the enlarged head portion of said piston member for the telescopic extension of said bridle assembly, means for admitting fluid under pressure between said inner piston and the piston head of said piston member for telescopic retraction of said piston member within said cylinder member and further means operatively connected to said support member for pivotally rotating said bridle assembly between a retracted stowed position within adjacent structure and an extended operative position.

4. An aircraft, a trunnion member rotatably mounted upon said aircraft, a cylinder member rotatably mounted upon said trunnion member, a piston member telescopically mounted within said cylinder member, said cylinder member forming the sole support for said piston member, means carried by said piston member for engagement with a forwardly directed catapult device, fluid means for telescopically extending and retracting said piston member with respect to said cylinder member, resilient means connected to said aircraft and to said trunnion member adapted to urge said piston and cylinder members into an operative position in which said piston and cylinder members extend forwardly and downwardly in the direction of flight of the aircraft, and further fluid means for retracting said piston and cylinder members to an inoperative position within the aircraft.

5. An aircraft assembly of the type called for in claim 4 characterized by the inclusion of a projecting element carried upon the upper forward surface of said cylinder member in its operative position adapted to engage a barrier cable in an emergency landing of said aircraft.

6. In an aircraft adapted for catapult take-off, a trunnion member rotatably mounted upon the aircraft upon a transverse axis, a cylinder member mounted at an aft portion of said cylinder member upon said trunnion member for limited lateral movement with respect thereto upon an axis spaced from and angularly disposed with respect to said transverse axis, a piston member telescopically mounted within the forward portion of said cylinder member, said piston member extending forward of said trunnion axis in its retracted position and extending forwardly and downwardly therefrom in its extended operative position, said piston member having an opening formed adjacent its forward terminal for engagement with a catapult, and fluid means operatively connected to said trunnion member including a fluid motor and a fluid reservoir for telescopically extending and automatically retracting said piston member with respect to said cylinder member.

7. In an aircraft, a fuselage having an opening therein, a support member pivotally mounted within said fuselage on an axis lying in a transverse plane, a cylinder member pivotally mounted upon said support member on an axis lying in a vertical plane, a piston member telescopically mounted within said cylinder member, closure means attached to said support member for closing and fairing said fuselage opening, means for rotating said support member about said first axis into an operative position at which said piston and cylinder members extend downwardly and forwardly through said opening and are adapted to be pivoted laterally with respect to said support member about said second axis, means for telescoping said piston member within said cylinder member, and retracting means operatively connected to said support member for rotating said support member into a stowed position of said piston and cylinder members in which said closure means closes and fairs said fuselage opening.

References Cited in the file of this patent

UNITED STATES PATENTS

| | | |
|---|---|---|
| 1,852,099 | Arcier | Apr. 5, 1932 |
| 1,893,591 | Minshall | Jan. 10, 1933 |
| 2,419,438 | Clark | Apr. 22, 1947 |
| 2,626,768 | Shank | Jan. 27, 1953 |
| 2,653,777 | Barkey | Sept. 29, 1953 |
| 2,670,156 | Clark et al. | Feb. 23, 1954 |

FOREIGN PATENTS

| | | |
|---|---|---|
| 605,030 | Great Britain | July 14, 1948 |
| 700,409 | Great Britain | Dec. 2, 1953 |